Dec. 7, 1965 J. P. SHAMPTON 3,221,842
BRAKE ADJUSTER
Filed Dec. 10, 1963 3 Sheets-Sheet 1

INVENTOR.
JOHN P. SHAMPTON
BY D.D. McGraw
ATTORNEY

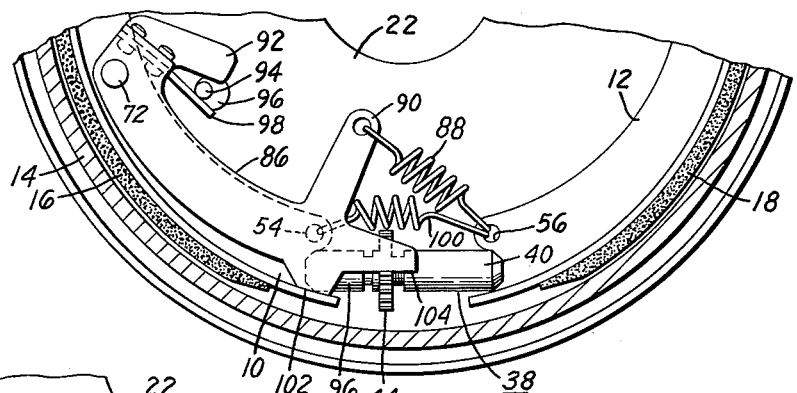
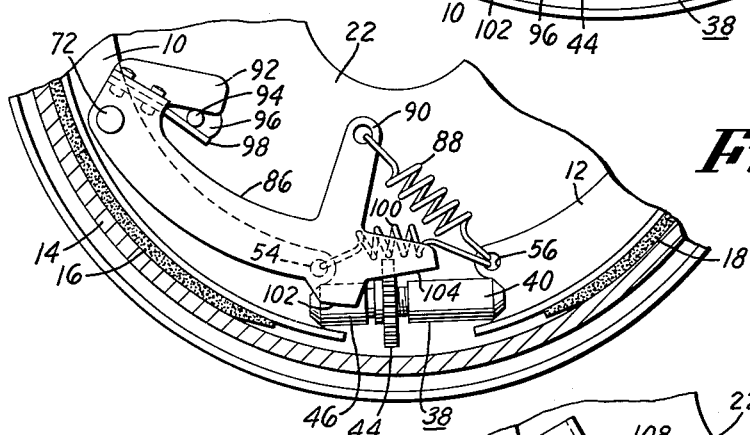
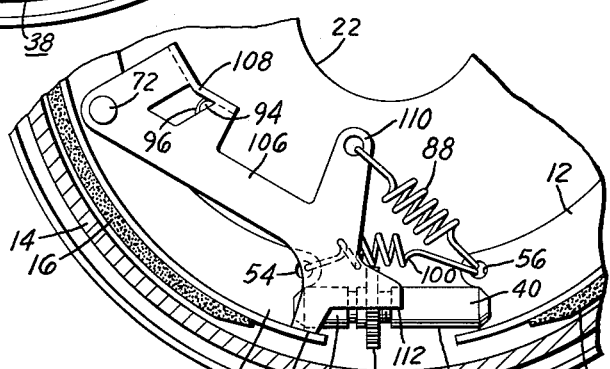
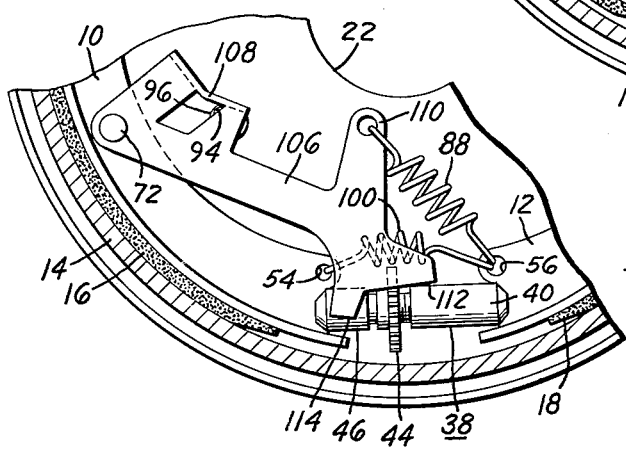

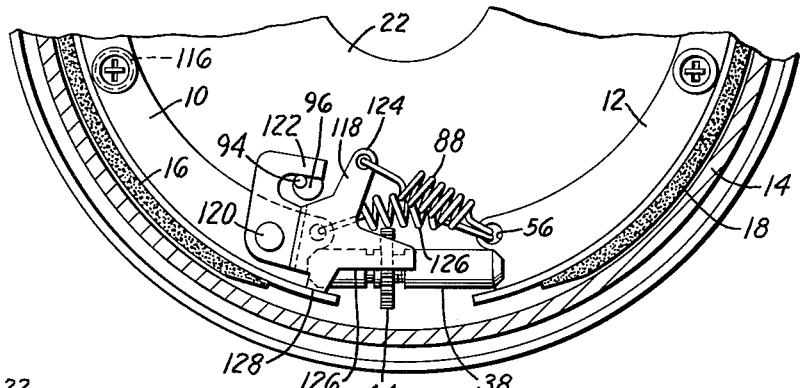
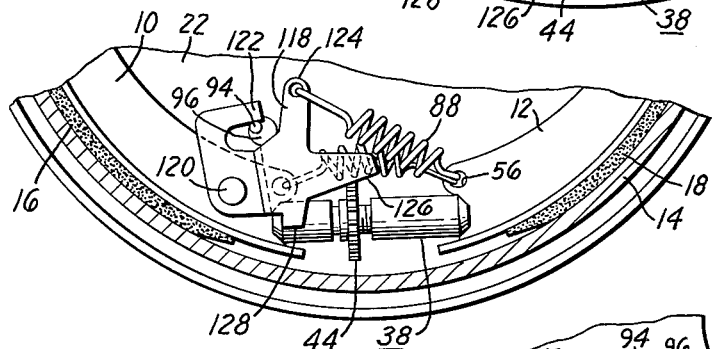
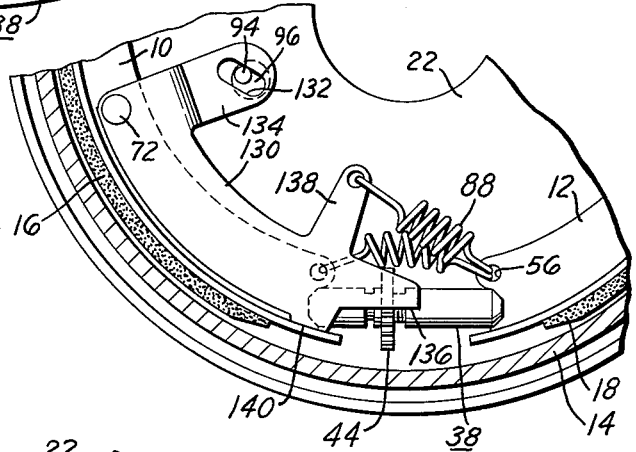
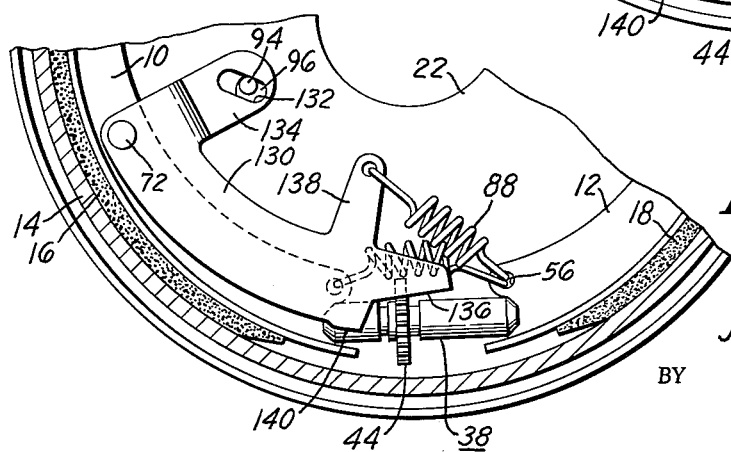

United States Patent Office 3,221,842
Patented Dec. 7, 1965

3,221,842
BRAKE ADJUSTER
John P. Shampton, Dayton, Ohio, assignor to General Motors Corporation, Detroit, Mich., a corporation of Delaware
Filed Dec. 10, 1963, Ser. No. 329,554
11 Claims. (Cl. 188—79.5)

This invention relates to vehicle brakes and more particularly to a simple, self-adjusting mechanism for duo servo brakes.

In the normal operation of vehicle brakes of the type in which a pair of brake shoes carrying brake linings are disposed to make contact with a rotating drum, a brake adjustment problem exists. The problem is caused by the wearing away of the brake linings over a period of time and the consequent increase of the distance between the brake linings and the brake drum. This increase in distance between the lining and the drum normally necessitates a greater travel of the wheel cylinders and, therefore, the brake pedal, to bring about the braking action when linings are worn. This increase in the amount of brake pedal travel can create an unsafe condition in that the reaction time of a vehicle operator in applying the brakes is somewhat increased.

It is an object of the present invention to provide improved mechanism for automatically adjusting vehicle brakes.

It is another object of the present invention to provide a very simple and economical mechanism for sensing excessive brake shoe movement during actuation of the brakes and correcting the situation during brake retraction.

It is a further object of the present invention to utilize the actuating movement of a brake shoe to poise a brake adjusting means into a position from which an incremental adjustment can be made on brake retraction.

It is still a further object of the present invention to provide an improved means for automatically adjusting duo servo brakes of common design.

Further objects and advantages of the present invention will be apparent from the following description, reference being had to the accompanying drawings wherein preferred embodiments of the present invention are clearly shown.

In the drawings:

FIGURE 3 is an elevational view with parts broken away of a second embodiment of the present invention;

FIGURE 4 is a sectional view with parts broken away of the mechanism of FIGURE 3 with the adjuster being shown in a poised position;

FIGURE 5 is an elevational view of a third embodiment of the invention shown mounted on a typical duo servo brake;

FIGURE 6 is a sectional view with parts broken away of the mechanism of FIGURE 5 with the mechanism embodying the invention being shown in a poised position;

FIGURE 7 is an elevational view of a fourth embodiment of the invention shown mounted on a typical duo servo brake;

FIGURE 8 is a sectional view with parts broken away of the mechanism of FIGURE 7 with the mechanism embodying the invention being shown in a poised position;

FIGURE 9 is an elevational view of a fifth embodiment of the invention shown mounted on a typical duo servo brake;

FIGURE 10 is a sectional view with parts broken away of the mechanism of FIGURE 9 with the mechanism embodying the invention being shown in a poised position.

Figure 1:
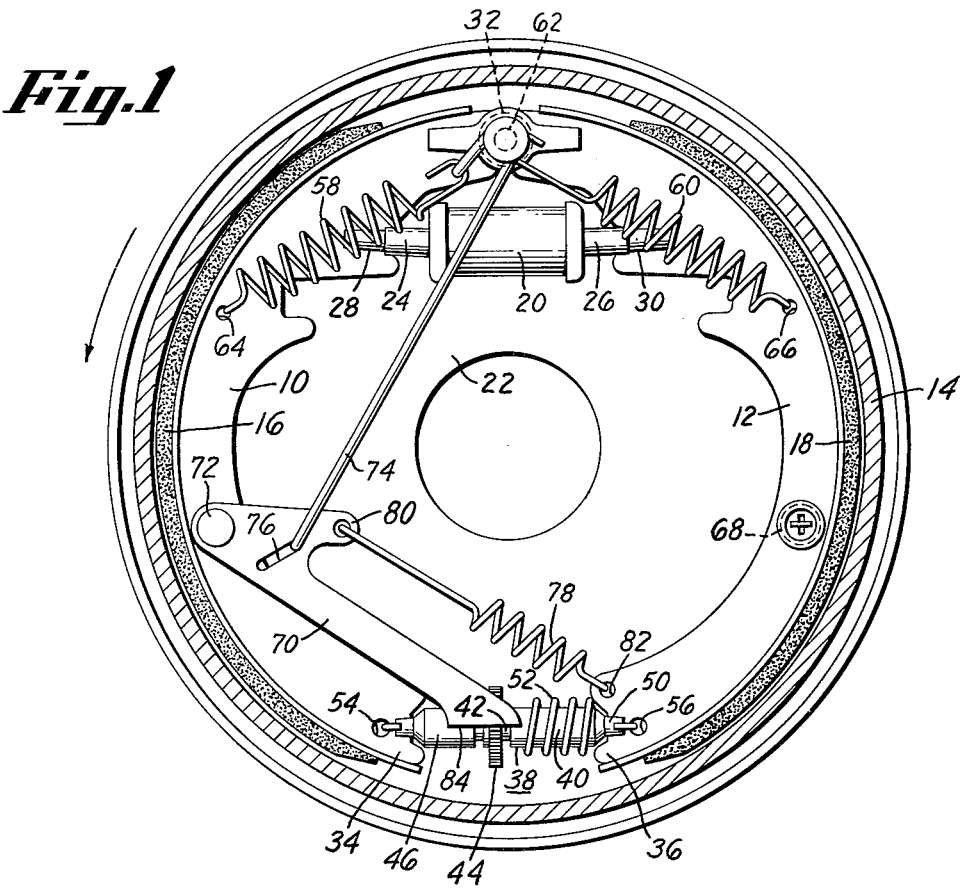
FIGURE 1 is an elevational view of a first embodiment of the invention shown mounted on a typical duo servo brake.

Referring now to FIGURE 1, a first brake shoe 10 and a second brake shoe 12 are mounted in opposed fashion in close proximity to a brake drum 14 which is adapted for rotating movement. Brake linings 16 and 18 are carried by the brake shoes 10 and 12, respectively, and are adapted to frictionally engage the inside periphery of the brake drum 14 during its rotation in response to hydraulic pressure exerted on a wheel cylinder 20. The wheel cylinder 20 is mounted on a backing plate 22 in any well-known manner and has a pair of plungers 24 and 26 engaging slots 28 and 30 in the brake shoes 10 and 12, respectively. Backing plate 22 is herein referred to as a fixed portion of the braking system. An anchor pin 32 is carried by the backing plate 22 and is adapted to engage arcuate slots, not shown, formed in opposed ends of the brake shoes 10 and 12. The opposite end 34 of the brake shoe 10 and the opposite end 36 of the brake shoe 12 are maintained in separated disposition by an adjusting mechanism, generally designated by the numeral 38.

The adjusting mechanism 38 is of common design and is comprised of a threaded sleeve 40, a threaded shaft 42 carrying a toothed wheel 44, and a sleeve 46 having a cylindrical depression therein, not shown, cooperating with a cylindrical end, not shown, of the threaded shaft 42. A sleeve 40 has a slotted end 50 cooperating with the end 36 of the brake shoe 12. Rotation of the toothed wheel 44 in one direction causes the threaded shaft 42 to extend from the cooperating threaded sleeve 40 to increase the separation of the ends 34 and 36 of the brake shoes 10 and 12, respectively. Rotation of the toothed wheel 44 in the opposite direction will cause the threaded shaft 42 to travel into the threaded sleeve 40, thereby lessening the distance between the opposed ends 34 and 36 of the brake shoes 10 and 12, respectively. It therefore becomes apparent that any rotation of the toothed wheel 44 will cause the brake shoes 10 and 12 to pivot around the anchor pin 32 and approach or move further away from the brake drum 14. A spring 52 engaging cooperating apertures 54 and 56 serves to bias the threaded sleeve 40 towards the threaded shaft 42, thereby inhibiting any change in an adjustment between these parts already established.

A spring 58 and a spring 60 engage a lug 62 carried by the anchor pin 32 on one end and apertures 64 and 66 of the brake shoes 10 and 12, respectively, on the other end to maintain the opposed ends of the brake shoes 10 and 12 in biased engagement with the anchor pin 32. A hold-down spring 68 serves to retain the brake shoe 12 in loose engagement with the backing plate 22.

In normal operation of the brake system illustrated, it will be assumed that the brake drum 14 is rotating in the direction of the arrow shown in FIGURE 1. As presssure is put on the wheel cylinder 20 by hydraulic mechanism in any well-known manner, the plungers 24 and 26 will be driven into force transmitting relation with their cooperating slots in the brake shoes 10 and 12. The brake linings 16 and 18 may come into engagement with the rotating drum 14 substantially simultaneously but, due to the direction of rotation, the initial contact of the brake lining 16 with the rotating drum 14 will cause the brake shoe 10 to be driven in the direction of rotation. This movement of the brake shoe 10 will be transmitted to the brake shoe 12 through the adjusting mechanism 38 to drive the lining 18 more firmly against the rotating drum 14. This is the normal duo servo type brake operation.

Referring now to FIGURE 1, wherein a first embodiment of the subject invention is illustrated, a lever 70 is pivotally mounted to the brake shoe 10 at point 72, which may also be the point of attachment of a hold-down spring for brake shoe 10. A rod 74 forms a mechanical link between the end of a slot 76 in the lever 70 and the anchor pin 32. A tension spring 78 serves to bias the lever 70 against the rod 74 by engaging a driving portion 80 of the lever 70 and an aperture 82 in the second brake shoe 12. In this manner, an actuating portion 84 of the lever 70 is kept in firm engagement with one of the teeth of the toothed wheel 44.

In operation of the duo servo brakes hereinbefore described, the movement of the first brake shoe 10 toward the drum 14 and in the direction of rotation of the drum 14 will cause the point 72 to move in a counterclockwise fashion relative to the end of the rod 74 engaging the slot 76 in the lever 70. Consequently, the actuating portion 84 of the lever 70 will be pivoted out of engagement with the tooth of the toothed wheel 44 that it previously engaged and will be raised an amount proportional to the distance that the first brake shoe 10 had to travel to engage the rotating drum 14. This position attained by the lever 70 during brake actuation will be hereinafter referred to as the poised position and this position is clearly illustrated in FIGURE 2.

Figure 2:
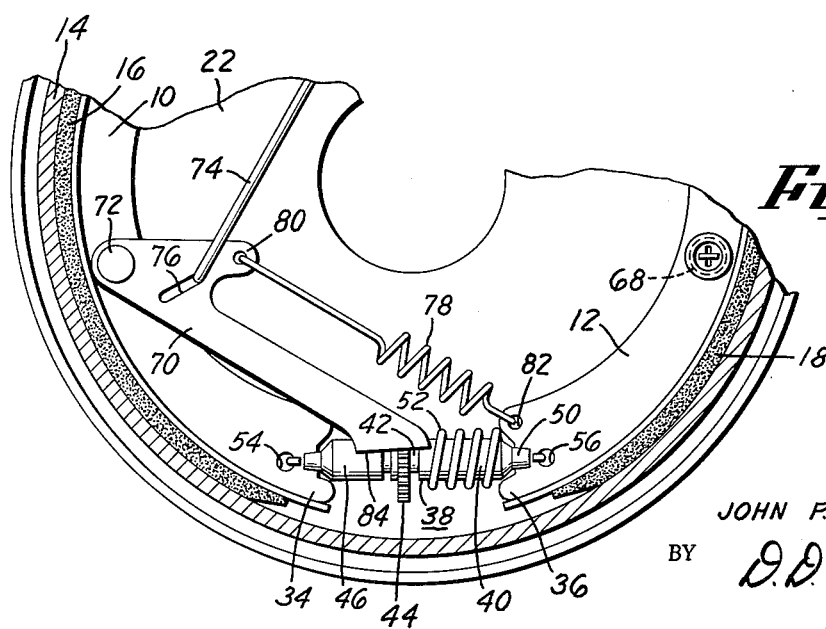
FIGURE 2 is a sectional view with parts broken away of the mechanism of FIGURE 1 embodying the invention with the mechanism shown in a poised position.

As the brake shoes 10 and 12 are returned to their retracted positions by the springs 58 and 60, the point 72 will move in a clockwise fashion around the end of the rod 74 and the slot 76, thereby allowing the actuating portion 84 of the lever 70 to pivot downwardly as viewed in FIGURE 2 by the tension of the spring 78. If the movement of the brake shoe 10 toward the drum 14 has been sufficient to raise the actuating portion 84 of the lever 70 the distance separating two adjacent teeth on the toothed wheel 44, the actuating portion 84 of the rod 70 will engage the tooth adjacent the one formerly engaged and drive the toothed wheel 44 rotationally on the axis of the threaded shaft 42. As previously described, any rotation of the toothed wheel 44 in one direction will cause an extension of the adjusting mechanism 38, thereby driving the brake shoe 10 and the brake shoe 12 further apart and in closer proximity to the drum 14. Therefore, it is seen that a proportion is set up between the arcuate movement of the point 72 relative to the drum 14 and the spacing between the teeth of the toothed wheel 44. The mechanism is so designed that the amount of extension of the adjusting mechanism 38 brought about by the rotation of the toothed wheel 44 is always slightly less than the pivotal movement of the point 72 during brake actuation. In this manner, the lever 70 will be pivoted far enough to drive the brake shoes 10 and 12 into engagement with the drum 14 but will remain a certain distance removed therefrom.

If the movement of the point 72 during brake actuation is not sufficient to move the actuating portion 84 of the lever 70 the distance separating two adjacent teeth on the toothed wheel 44, no adjusting movement takes place and the lever 70 is rocked back into engagement with the tooth of the toothed wheel 44 that it previously engaged during brake retraction. Therefore, the brake lining 16 will have to wear a distance sufficient to allow pivotal movement of the lever 70 to engage a new tooth on a toothed wheel 44 in order to bring about a brake adjustment.

Another embodiment of the invention is illustrated in FIGURES 3 and 4. Referring to FIGURE 3, a lever 86 is pivotally mounted on the first brake shoe 10 at point 72. The hold-down spring for shoe 10 may be positioned at another portion of the shoe web in this construction. A spring 88 serves to bias a driving lug 90 of a lever 86 toward the second brake shoe 12. The lever 86 has a second driving portion 92 adapted to engage a pin 94 which is carried by a threaded element 96 in an eccentric manner. A leaf spring 98 is carried by the lever 86 and serves to assist the centering of the brake shoe 10. In this embodiment, a spring 100 engages the apertures 54 and 56 to maintain the first and the second brake shoes in firm engagement with the adjusting mechanism 38. A surface 102 of the lever 86 rests against the inside edge of the brake shoe 10 and serves to limit travel of the lever 86 during this adjusting movement.

The operation of this embodiment is very similar to the first embodiment in that the lever 86 pivots around the point 72 during the brake actuation as illustrated in FIGURE 4. The second driving lug 92 engages the pin 94 during the movement of the brake shoe 10 toward the drum 14. The lever 86 will be driven into a poised position against the tension of the spring 88 during the brake actuation and, if the movement of the brake shoe 10 toward the drum 14 is of sufficient magnitude, the actuator portion 104 of the lever 86 will engage another tooth of the toothed wheel 44. As the brake shoe 10 is retracted after brake actuation, the spring 88 will pivot the lever 86 in a clockwise fashion around the pin 94, thereby driving the toothed wheel 44 on its axis to bring about a greater separation of the brake shoes 10 and 12. This clockwise movement of the lever 86 around the pin 94 will continue until the surface 102 contacts the inside edge of the brake shoe 10, thereby bringing an end to the adjusting movement of the lever 86.

In the same manner as previously described, if the movement of the brake shoe 10 towards the drum 14 is of small magnitude, the actuator portion 104 of the lever 86 will not engage a new tooth on a toothed wheel 44 and no adjustment will take place. It should be noted that in this embodiment, the leaf spring 98 exerts a load tending to help the shoe 10 toward the primary side and thereby assists in clearing the second brake shoe 12 from the drum on each stop. Proper spring return and angle cause a good centralizing action that is independent of the type or severity of the stop as centralizing takes place with a relaxed drum.

Another embodiment of the invention is illustrated in FIGURES 5 and 6. Referring to FIGURE 5, a lever 106 is pivotally mounted on the brake shoe 10 at point 72. In this embodiment, the inside surface of a flange 108 formed as a part of the lever 106 is adapted to engage the pin 94 carried by the threaded element 96. The spring 88 serves to bias the lever 106 toward the second brake shoe 12 by engaging a driving lug 110 of the lever 106 and the aperture 56 in the second brake shoe 12. The adjusting mechanism 38 functions in the same manner as previously described.

In operation, as the brake shoe 10 moves towards the drum 14 during the actuation of the brakes, the lever 106 is caused to pivot around the pin 94 which is carried by the threaded element 96 adjustably engaging the backing plate 22. In the same manner as previously described, the lever 106 will be raised to a poised position relative to the toothed wheel 44 an amount proportional to the distance the brake lining 16 moves toward the drum 14. If sufficient wear has occurred to provide the appropriate amount of pivotal movement of the lever 106, an actuating portion 112 of the lever 106 will engage another tooth of the toothed wheel 44. The poised position of the lever 106 is illustrated in FIGURE 6. In much the same manner as previously described, the spring 88 will draw the lever 106 in a clockwise fashion relative to the fixed pin 94 during brake retraction and, if another tooth of the toothed wheel 44 has been engaged, it will cause an incremental separating of the brake shoes 10 and 12. If the pivotal movement of the lever 106 has not been sufficient to have the actuating portion 112 of the lever 106 engage another tooth of the toothed wheel 44, no adjustment will take place and the lever 106 will again come to rest with a surface 114 engaging the inside edge of the brake shoe 10.

Another embodiment of the invention is illustrated in FIGURES 7 and 8. Referring to FIGURE 7, a hold-down spring 116 of the same type as the hold-down spring 68 maintains the brake shoe 10 in biased engagement with the backing plate 22. In this embodiment, a lever 118 is carried for pivotal movement by the brake shoe 10 at point 120. The pin 94, carried for eccentric movement by the threaded element 96 adjustably engaging the backing plate 22, cooperates with a driving portion 122 of the lever 118. The spring 88 engages a driving arm 124 of the lever 118 and the aperture 56 of the second brake shoe 12 in the same manner as previously described in the second and third embodiments. The adjusting mechanism 38 functions exactly as previously described.

In operation, as the brake shoe 10 moves towards the drum 14 during a brake actuation, the driving portion 122 of the lever 118 engages the fixed pin 94 and causes a pivoting of the lever 118 in a counterclockwise fashion relative to the pin 94. This pivoting of the lever 118 will draw it into a poised position as illustrated in FIGURE 8. Again, as described in the previous embodiments, if the pivotal movement of the lever is sufficient to draw an actuating portion 126 into engagement with another tooth on the toothed wheel 44, the retracting motion of the brake shoe 10 will allow the spring 88 to pivot the lever 118 in a clockwise fashion relative to the pin 94, thereby causing the toothed wheel 44 to rotate on its axis to bring about a separating of the brake shoe 10 and the brake shoe 12. This clockwise pivotal movement of the lever 118 will continue until a stop 18 contacts the inside edge of the brake shoe 10.

Still another embodiment of the present invention is illustrated in FIGURES 9 and 10. Referring now to FIGURE 9, a lever 130 is pivotally mounted on the first brake shoe 10 at point 72. A slot 132 in a first driving lug 134 of the lever 130 engages the pin 94 carried for eccentric movement by the threaded element 96, the threaded element 96 firmly engaging the fixed backing plate 22. The adjusting mechanism 38 functions in the same manner as previously described and an actuating portion 136 of the lever 130 is adapted to engage any one of the peripheral teeth on the toothed wheel 44. The spring 88 engages a second driving lug 138 of the lever 130 and the aperture 56 in the second brake shoe 12 to bias the lever 130 against a stop 140.

In operation, as the brakes are actuated and the brake lining 16, carried by the shoe 10 is driven into engagement with the drum 14, the lever 130 is caused to pivot around the fixed pin 94. This pivoting of the lever 130 in a counterclockwise fashion around the pin 94 causes the actuating portion 136 of the lever 130 to be drawn around the periphery of the toothed wheel 44. Again, as in the previous embodiments, if the movement of the brake shoe 10 is sufficient to move the actuating portion 136 of the lever 130 into engagement with another tooth on the toothed wheel 44, the retracting motion of the brake shoe 10 will allow the spring 88 to draw the lever down until the stop 140 engages the inside portion of the brake shoe 10. Any turning of the toothed wheel 44, as previously described, will cause the brake shoes 10 and 12 to be driven further apart and, consequently, in closer proximity to the inside periphery of the drum 14, thereby causing an adjustment of said brake shoes. If the distance the brake shoe 10 moves as the brakes are actuated is not sufficient to pivot the lever 130 enough to engage another tooth on the toothed wheel 44, the lever 130 will be returned by the spring 88 to its resting point against the stop 140 without any shoe adjustment having taken place.

It should be noted that the pin 94 mounted for eccentric movement of the threaded element 96 is relatively fixed due to the mounting of the threaded element 96 to the backing plate 22. However, it should be understood that the pin 94 can be preset to a different fixed position relative to the lever 130, thereby making the lever 130 responsive to a greater or a lesser amount of brake lining wear. It is also possible to position the fixed pin 94 at a point where it will no longer cause the lever 130 to be pivoted during a brake actuation in a manner that would be desirable to indicate to a vehicle operator that brake lining wear had progressed to a predetermined low point.

Another feature worthy of note is the mounting of the actuating lever in all but one of the embodiments at a point corresponding to the location of a hold-down spring, such as described in the forth embodiment by the numeral 116. Therefore, it is possible to pivotally mount the adjusting lever on a portion of the hold-down spring structure or to substitute a pivotal mounting of the lever on the shoe for the hold-down spring. It may be desirable in some constructions to loosely mount the lever on the shoe for pivotal movement to enable the actuating portion of the lever to follow the contour of the toothed wheel in order to engage an adjacent tooth more readily.

In connection with this positioning of the actuating portion of the lever to the toothed wheel, it should also be noted that the actuating portion of the lever just clears the tooth of the toothed wheel which was most recently engaged as the lever rests against its stop to allow manual movement of the toothed wheel in the opposite direction when it is desired to remove the drum from the wheel. This feature is of some importance due to the fact that it is common in assemblies of the type described to have grooves worn in the drum by the brake lining that would impede free movement of the drum across the brake linings during disassembly thereof.

The cooperation of the actuating portion of the lever and the teeth on the periphery of the toothed wheel can be likened to a ratcheting action where the actuating portion of the lever is the pawl and the peripheral teeth of the toothed wheel comprise the gear.

It is clear from an examination of the description and drawings that the subject invention is operative when installed on either the primary or the secondary brake shoes. Therefore, the versatility of this invention is obvious in that an adjusting of the brakes takes place when the brakes are actuated as the vehicle is traveling in a forward direction. This feature has particular utility when the device is mounted on vehicles have a predominantly forward travel, e.g., racing cars, taxicabs, etc.

While the embodiments of the present invention as herein disclosed, constitute preferred forms, it is to be understood that other forms might be adopted.

What is claimed is as follows:

1. A device for adjusting brake shoes carrying linings adapted to contact a rotating drum, comprising: lever means pivotally carried by a first brake shoe, means carried by a fixed portion of a vehicle engaging said lever during a brake actuation to cause a cam action therearound as said lever means moves toward the drum, expandable means including a driving star wheel interposed between one end of a first shoe and a second shoe, and resilient means engaging said lever means and the second shoe, said lever means being cammed to a new pivotal position during a brake actuation wherein said lever is adapted to engage said star wheel and drive said expandable means apart in response to increasing brake lining wear thereby positioning the linings in closer proximity to the rotating drum.

2. A brake shoe adjuster for duo servo brakes comprising: lever means pivotally mounted on a first brake shoe, brake shoe separating means including a drive wheel therefor engaging opposed ends of a first and a second brake shoe, and lever drive means engaging said lever and the second brake shoe, said lever means engaging said drive wheel and being connected to fixed pin means whereby said lever is cammable to another position relative to said drive wheel wherein said lever is adapted to turn said drive wheel thereby positioning the first and second brake shoes in closer proximity to the brake drum in response to progressing brake lining wear.

3. In a vehicle brake having a first and a second brake shoe adapted to frictionally engage a rotating drum, a brake adjuster comprising: lever means pivotally carried by the first brake shoe, expandable means including a drive wheel therefor engaging opposed ends of the first and second brake shoes for positioning the shoes in close proximity to the rotating drum, cam means, at least one portion of which is carried by a backing plate for moving said lever into a poised position as said lever moves with a brake shoe during a brake actuation, and drive means engaging said lever and the second shoe to bring said lever into driving engagement with said drive wheel to adjust the vehicle brakes relative to the rotating drum in response to movement of the first shoe to a position of rest after a brake actuation.

4. An adjusting device for a vehicle brake including a first and a second brake shoe adapted to frictionally engage a rotating drum, said device comprising: lever means pivotally mounted on a first brake shoe, expandable means disposed between ends of first and second brake shoes and adapted to drive opposed ends of the first and second brake shoe toward a brake drum, resilient means engaging said lever means and the second brake shoe, and fixed means carried by a fixed portion of the vehicle in juxtaposition to the first brake shoe and being arranged to pivot said lever means on its pivotal mounting as the first brake shoe moves towards the drum during a brake actuation, said resilient means being adapted to move said lever means into driving engagement with said expandable means to change the relative distance between the brake shoes and the rotating drum during the release of the brakes.

5. An adjusting device for vehicle brakes having a first and second brake shoe adapted to frictionally engage a rotating drum, said device comprising: a lever pivotally mounted on the first brake shoe and having driving portions and an actuator portion, an expandable strut adapted to drive opposed ends of the first and second brake shoe towards the rotating drum, said expandable strut having a ratchet wheel carried by a threaded portion of said strut for causing an extension thereof, a pivot pin carried for eccentric movement on a fixed portion of the brake system and adapted to engage one of said driving portions of the lever to bring said lever into a poised position during actuation of the brakes, and resilient means attached to another driving portion of said lever on one end and attached to the second brake shoe on another end, said resilient means being flexed during the pivotal movement of the lever around the fixed pin during a brake actuation, said resilient means drawing the driving portion of the lever into engagement with the ratchet wheel during a brake release thereby causing said expandable strut to extend and move the first and second brake shoes in closer proximity to the rotating drum, the pivotal movement of the lever around the fixed pin being proportional to the amount of movement of the first brake shoe during the brake actuation and thereby causing a movement of the ratchet wheel in the same proportion on brake retraction.

6. An adjusting device for a brake system having a first and a second shoe adapted to frictionally engage a rotating brake drum, said device comprising: a lever means pivotally carried by the first brake shoe and having an extension with an elongated slot therein, pin means carried for eccentric movement by a threaded element, said threaded element in turn carried by a fixed portion of the vehicle, expandable means adapted to drive opposed ends of the first and second brake shoe toward the rotating drum, the pin means being carried by a fixed portion of the brake system and arranged to engage the elongated slot in said lever extension, the engagement of the pin and slot causing the lever means to rotate on its pivotal mounting into a poised position during a brake actuation, and resilient means engaging the second brake shoe and the lever means for drawing said lever means from a poised position into engagement with the expandable means during a brake retraction to move the first and the second brake shoe into closer proximity to the rotating brake drum.

7. An adjusting device for a brake system having a first and a second shoe adapted to frictionally engage a rotating brake drum, said device comprising: a lever having an actuator portion and driving portions, said lever being pivotally mounted on a brake shoe, a pin carried for eccentric movement on a threaded element adjustably threaded to a stationary portion of the brake system, said pin camming said lever by drivably engaging a slot formed in one of the driving portions of the lever, expandable means including a threaded shaft carrying a toothed wheel and being adapted to extend from a fixed sleeve, said expandable means engaging opposing ends of the first and second brake shoes and being adapted to drive the brake shoes toward the rotating drum in a selective manner, and resilient means engaging another of the drive portions of said lever and the second brake shoe, said lever being arranged to be carried toward the brake drum during a brake actuation while said pin and the slot carried in one of said driving portions cooperate to pivot the opposite end of said lever against the tension of the resilient means into a poised position juxtaposed to said toothed wheel during a brake actuation, said resilient means arranged to draw said lever from the poised position into engagement with the geared wheel during a brake retraction to cause an extension of the expandable means, thereby adjusting the distance between the brake shoes and the drum.

8. An adjusting device for a brake system having a first and a second shoe adapted to frictionally engage a rotating brake drum, said device comprising: lever means including shoe centralizing means, said lever being pivotally mounted on a first brake shoe, expandable means adapted to move the first and the second brake shoe in opposite directions in closer proximity to the rotating drum, cam means carried by a fixed portion of the brake system and raising said lever means into a poised position relative to said expandable means during a brake actuation, and resilient means engaging said lever means and the second brake shoe to draw said lever in a pivotal manner from a poised position established during a brake actuation into engagement with the expandable means during brake retraction thereby causing an incremental adjusting movement of the first and second brake shoes towards the rotating drum.

9. An adjusting device for a brake system having a first and a second shoe adapted to frictionally engage a rotating brake drum, said device comprising: a lever carrying a leaf spring member and being pivotally mounted on the first brake shoe, said lever having driving portions and an actuator portion, stop means for limiting the pivotal movement of the lever in one direction, a pin eccentrically mounted on a rotatably adjustable element carried by a fixed portion of the brake system and being adapted to engage one of the driving portions of said lever during a brake actuation to cause a pivotal movement of said lever, expandable means including a ratchet wheel driven threaded portion cooperating with a threaded sleeve and portions arranged to engage opposed ends of the first and second brake shoe, said expandable means being arranged to drive the first and second shoes incrementally towards the brake drum in response to rotational movement of the ratchet wheel on the longitudinal axis of the threaded portions and resilient means engaging another of the driving portions of said lever and the second shoe, said lever being driven to a poised position during a brake actuation by the engagement of the pin with one of said lever driving portions against the biasing force of the resilient means, said lever actuator portion being driven into engagement with the ratchet wheel of the expandable means during a brake retraction thereby driving said ratchet wheel in a rotational manner to extend the expandable means against the first and second brake shoes, the movement of the lever being limited by the engagement of the stop portion with the brake drum, said leaf spring biasing the first brake shoe against the servo action of the brakes during a brake actuation thereby allowing the second brake shoe to clear the brake drum on brake retraction.

10. An adjusting device for a brake system having a first and a second brake shoe adapted to frictionally engage a rotating brake drum, said device comprising: lever means including a driving flange and being pivotally mounted on the first brake shoe, brake shoe separating means interposed between the first and the second brake shoe, pivot means adjustably carried by a fixed portion of the brake system and arranged to engage the driving flange of the lever means during a brake actuation thereby camming said lever means to a poised position, and lever driving means engaging the brake lever and the second brake shoe for drawing the lever from the poised position into engagement with the brake shoe separating means after a brake actuation to move the first and second brake shoes incrementally toward the rotating drum.

11. An adjusting device for a brake system having a first and a second brake shoe adapted to frictionally engage a rotating brake drum, said device comprising: a lever having a flanged portion for driving said lever in one direction, said lever being pivotally mounted on the first brake shoe, a bolt element carrying a ratchet wheel and adapted to cooperate with a threaded sleeve to move the threaded sleeve away from the ratchet wheel, a stationary sleeve having a cylindrical pocket arranged to cooperate with the bolt portion to drive opposed ends of the first and second shoes in the direction of the rotating drum, a pivot pin carried by a backing plate and camming the lever carried flange during the brake actuation to lift the lever relative to the ratchet wheel, said pivot pin being carried for eccentric movement around a threaded element engaging a fixed portion of the brake system, and resilient means engaging the lever and the second brake shoe, said resilient means being put under tension by the movement of the lever as it pivots about the pivot pin during a brake actuation and adapted to draw the lever into engagement with the ratchet wheel to turn the bolt carrying the ratchet wheel to separate the brake shoes an incremental amount during brake retraction.

References Cited by the Examiner
UNITED STATES PATENTS

| | | | |
|---|---|---|---|
| 2,221,090 | 11/1940 | Goepfrich | 188—196 |
| 2,389,618 | 11/1945 | Goepfrich | 188—196 |
| 2,762,463 | 9/1956 | Brooks | 188—79.5 |
| 2,938,610 | 5/1960 | Dombeck et al. | 188—79.5 |
| 3,111,200 | 11/1963 | Gores | 188—79.5 |
| 3,160,236 | 12/1964 | Riddy | 188—79.5 |

FOREIGN PATENTS 766,811 4/1934 France.

MILTON BOUCHLER, *Primary Examiner.*

DUANE A. REGER, ARTHUR L. LA POINT,
*Examiners.*